(12) United States Patent
Krantz

(10) Patent No.: US 6,269,453 B1
(45) Date of Patent: Jul. 31, 2001

(54) METHOD FOR REORGANIZING THE DATA ON A RAID-4 OR RAID-5 ARRAY IN THE ABSENCE OF ONE DISK

(75) Inventor: Joseph F. Krantz, Colorado Springs, CO (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/084,370

(22) Filed: Jun. 29, 1993

(51) Int. Cl.[7] .................................................. G06F 11/00
(52) U.S. Cl. ................................. 714/6; 714/19; 714/49; 714/764
(58) Field of Search ................................. 371/10.1, 21.6; 395/575, 425; 714/49, 48, 15, 19, 20, 6, 5, 764

(56) References Cited

U.S. PATENT DOCUMENTS

| | | |
|---|---|---|
| 4,092,732 | 5/1978 | Ouchi . |
| 4,434,487 | 2/1984 | Rubinson et al. . |
| 4,775,978 | 10/1988 | Hartness . |
| 4,914,656 | 4/1990 | Dunphy et al. . |
| 4,989,205 | 1/1991 | Dunphy et al. . |
| 4,989,206 | 1/1991 | Dunphy et al. . |
| 5,574,851 | * 11/1996 | Rathunde ........................ 395/182.06 |

OTHER PUBLICATIONS

Chen et al., "RAID Hight Performance Reliable Secondary Storage," ACM Computing Surveys, vol. 26, No. 2, pp. 141–146, 152–158, 164–166, 170–171, and 179–185, Jun. 1994.*

Burkhard et al., "Disk Aray storage system . . . ", IEEE Computer Society, abstract, Jun. 1993.*

Chandy et al., "Failure evaluation of disk array organization," IEEE Computer Society, abstract, May 1993.*

G. A. Gibson, "Redundant disk arrays . . . ", vol. 52/08–b of dissertation abstract international, pp. 4309, 1991.*

*A Case for Redundant Array of Inexpensive Disks (RAID)*, David A. Patterson, Garth Gibson, Randy H. Katz, Report No. UCB/CSD 87/391, Dec., 1987, Computer Science Division (EECS), University of California, Berkeley, CA 94720.

*A Case for Redundant Arrays of Inexpensive Disks (RAID)*, David A. Patterson, Garth Gibson, and Randy H. Katz, ACM SIGMOD Conference—Jun. 1–3, 1988, Chicago, Illinois.

*Two Papers on RAIDs*, Peter Chen, Garth Gibson, Randy H. Katz, David A. Patterson, Martin Schulze, Report No. UCB/CSD 88/479, Dec., 1988, Computer Science Division (EECS), University of California, Berkeley, CA 94720.

*An Introduction to RAID—Redundant Arrays of Inexpensive Disks,* Peter McLean, Apr. 24, 1991, Digital Equipment Corporation—CX01–2/N26.

*Software and Performance Issues in the Implementation of a RAID Prototype,* Edward K. Lee, Report No. UCB/CSD 90/573, May 1990, Computer Science Division (EECS), University of California, Berkeley, CA 94720.

*A Queuing Analysis of RAID Architectures,* Schenze Chen and Don Towsley, COINS Tech. Report 91–71, Department of Computer and Information Science, University of Massachusetts, Amherst, MA 01003.

* cited by examiner

Primary Examiner—Norman M. Wright
(74) Attorney, Agent, or Firm—J. Bradford Leaheey; William J. Kubida; Hogan & Hartson LLP

(57) ABSTRACT

In a storage system having a plurality of disks arranged in a RAID array with one of the disks failed, a method of reorganizing the data on the RAID array at the time of failure to prevent both a decrease in performance of the array and reliability of the data and an increase in the cost of operation. Data from the failed disk is regenerated one strip at a time and written onto the original parity chunk for the strip. The resulting fully folded array has the characteristics of a RAID level 0 array. When a replacement disk is inserted into the array the process is reversed to bring the fully folded array back to a fully redundant condition.

3 Claims, 4 Drawing Sheets

RAID - 5 ORGANIZATION

RAID - 4 ORGANIZATION

FULLY FOLDED RAID - 5 ORGANIZATION

FULLY FOLDED RAID - 4 ORGANIZATION

METHOD FOR REORGANIZING THE DATA ON A RAID-4 OR RAID-5 ARRAY IN THE ABSENCE OF ONE DISK

FIELD OF THE INVENTION

Data storage systems having a plurality of disks using RAID-4 or RAID-5 organizations experience a decrease in performance and reliability and an increase in the cost of operation of the array when one of the disks in the array fails and has not yet been replaced. The present invention is a method of reorganizing the data on the RAID array at the time of failure to prevent both a decrease in performance and reliability, and an increase in the cost of operation.

BACKGROUND OF THE INVENTION

RAID (Redundant Array of Independent/Inexpensive Disks) is an organization of data on a plurality of disks to achieve varying levels of availability and performance. One performance enhancing feature of RAID is "striping" which spreads data across the disks in the array. The data is broken down into segments referred to as "chunks." A chunk is a group of consecutively numbered blocks that are placed consecutively on a single disk before placing blocks on a different disk. A block is the smallest unit of data that can be read or written to a disk. Thus, a chunk is the unit of data interleaving for a RAID array. For example, in a four disk RAID array the first chunk is placed on the first disk, the second chunk is placed on the second disk, the third chunk is placed on the third disk, the fourth chunk is placed on the fourth disk, the fifth chunk is placed on the first disk and so on. This spreading of data increases performance through load balancing.

As is well know, there are several levels of RAID, each of which has different characteristics that affect performance and availability. One common aspect of all RAID levels is that each array appears as one large virtual disk to the user. RAID storage systems can be implemented in hardware or software. In the hardware implementation the RAID algorithms are built into a controller that connects to the computer I/O bus. In the software implementation the RAID algorithms are incorporated into software that runs on the main processor in conjunction with the operating system. Both the hardware and software implementations of RAID are well known to those of ordinary skill in the field.

RAID level 4 (RAID-4) and RAID level 5 (RAID-5) are organizations of data for an array of n+1 disks that provide enhanced performance through the use of striping and enhanced data availability through the use of parity. Each disk in the RAID array is referred to as a member of the array. Furthermore, while disks are referred to throughout, any equivalent storage media could be used as would be apparent to one of ordinary skill in the field. A parity block is associated with every n data blocks. The data and parity information is distributed over the n+1 disks so that if a single disk fails, all of the data can be recovered. A strip is the collection of a parity chunk and all data chunks that contribute to it. RAID-4 is a level of organization of data for a RAID array where data blocks are organized into chunks which are interleaved among the disks and protected by parity and all of the parity, is written on a single disk. RAID-5 is a level of organization of data for a RAID array where data blocks are organized in chunks which are interleaved among the disks and protected by parity and the parity information is distributed over all of the disks in the array. In both RAID-4 and RAID-5 the ensemble or array of n+1 disks appears to the user as a single, more highly available virtual disk.

The contents of each bit of the parity block is the Exclusive-OR of the corresponding bit in each of the n corresponding data blocks. In the event of the failure of a single disk in the array, the data from a given data block on the failed disk is regenerated by calculating the Exclusive-OR of the contents of the corresponding parity block and the n−1 data blocks remaining on the surviving disks that contributed to that parity block. A spare disk may be added to the array to replace the failed disk. A block or set of blocks is repaired by writing the regenerated data. The regeneration and repair of data for a data block or set of data blocks on a disk in a RAID array is referred to as reconstruction.

Under some circumstances a failed disk in the RAID array cannot be reconstructed or replaced promptly. During the time that the failed disk remains out of the RAID array the cost of operations increases and both performance and reliability decrease. Accordingly, if the storage system is to operate for any period of time with a failed disk of the RAID array it is desirable to improve both performance and reliability and prevent an increase in the cost of operation.

SUMMARY OF THE INVENTION

The present invention is a method of preventing an increase in the cost of operation while improving the performance and reliability of a storage system using a RAID-4 or RAID-5 organization of data when one of the disks in the RAID array has failed and has not yet been replaced. The method of the present invention reorganizes the data in the RAID array at the time a disk in the array fails, so that read and write operations to the array require the optimal number of operations and so that the performance of the RAID array and reliability of the data stored on the array is maximized while the cost of operation to the array is minimized. The reorganization is performed on each strip of the array.

The unavailable data for each strip of the array is regenerated using the data from the other chunks of the strip and the parity chunk of the strip by applying the standard RAID algorithms. The regenerated data corresponds to the unavailable data on the failed disk. The regenerated data is then written over the parity information on the parity chunk of the strip. This process is repeated for each strip forming the RAID array. The resulting organization of data is essentially that of a RAID-0 organized array except that the disk on which a chunk of data is stored may be unconventional. RAID-0 is a level of organization of data for a RAID array where the data is non-redundant. The resulting organization of data is referred to as a "fully-folded" RAID array and the process of reorganizing the data on the array is referred to as "folding."

When a replacement disk is added to a fully folded RAID array to restore the array to a redundant state, the folding process is reversed. For each strip in the array, if the replacement disk should contain parity information, an Exclusive-OR operation computes the parity from the data chunks on the other disks and writes the parity to the replacement disk. If the replacement disk should contain data, the data is read from the disk that originally contained parity and written on the replacement disk, then parity is computed from the corresponding data blocks and written on the appropriate disk.

BRIEF DESCRIPTION OF THE DRAWINGS

Other advantages of the invention will become apparent upon reading the following detailed description and upon reference to the accompanying drawings, in which.

Figure 1:
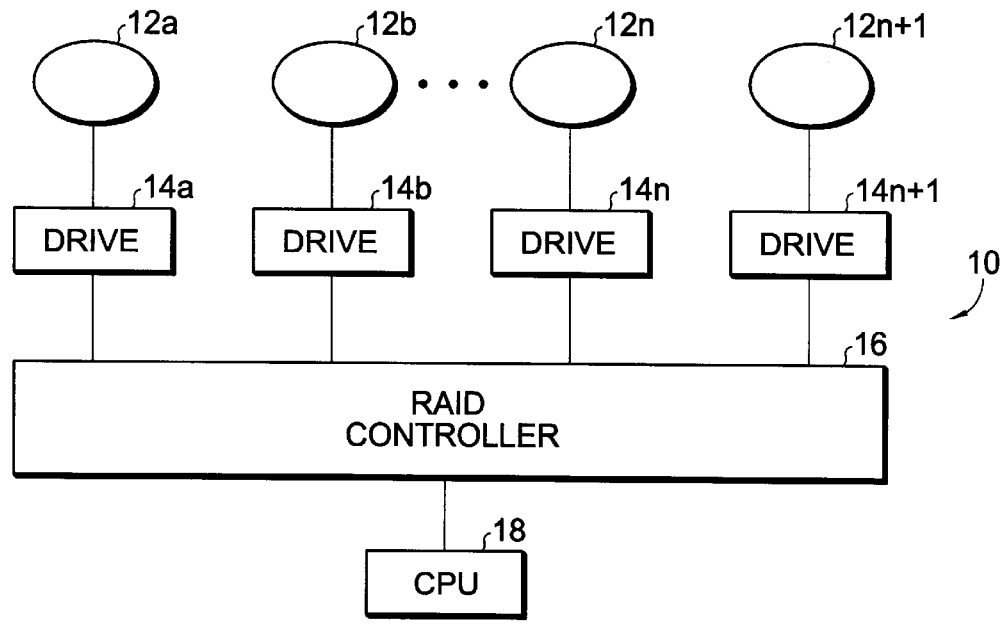
FIG. 1 is a typical storage system using a RAID array organization for implementing the present invention.

While the invention is susceptible to various modifications and alternative forms, specific embodiments thereof have been shown by way of example in the drawings and will herein be described in detail. It should be understood, however, that the invention is not intended to be limited to the particular forms disclosed. On the contrary, the applicant's intention is to cover all modifications, equivalents, and alternatives falling within the spirit and scope of the invention as defined by the appended claims.

DETAILED DESCRIPTION OF THE DRAWINGS

FIG. 1 is an illustration of a storage system 10 in which an array of n+1 disks 12 and associated drives 14 are connected to a RAID controller 16. A user, such as CPU 18, gains access to the n+1 disks 12 via normal read and write commands. The n+1 disks 12 are arranged into either a RAID-4 or RAID-5 organization based upon the selection of the well known RAID algorithms implemented in the RAID controller 16. The present invention is also usable with a host based software implementation of a RAID controller.

RAID-4 and RAID-5 are closely related organizations of n+1 disks 12 that provide enhanced performance through the use of striping and enhanced availability through the association of a parity block with every n data blocks. The data and parity information is distributed over the array of n+1 disks 12 so that if any single disk fails or otherwise becomes unavailable all of the data and/or parity information on the unavailable disk can be recovered. In the RAID-4 organization, all parity data is on a single disk and in the RAID-5 organization, the parity information is distributed over all of the disks in the array.

All access to the array of n+1 disks 12 is through the RAID controller 16 which is connected to the user or client application such as CPU 18. A single CPU is shown but using a plurality of CPU's is well within the ability of someone of ordinary skill in the field. The RAID controller 16 contains the standard RAID algorithms that are well known to one of ordinary skill in the field.

The array of n+1 disks 12 appears as a single, more highly available virtual disk to a user. The contents of each bit of the parity block is the Exclusive-OR of the corresponding bit in each of the n corresponding data blocks. As is well known, other error correction codes can be used to establish the mathematical relationship between the data and parity information. In the event of the failure or unavailability of a single disk in the array of n+1 disks 12, the data from a given data block on the unavailable disk is regenerated by computing the Exclusive-OR of the contents of the corre sponding parity block and the n−1 data blocks on the remaining disks in the array that contributed to that parity block. The unavailable data block, if possible, is repaired by writing the regenerated data. In this manner an entire unavailable disk can be reconstructed by regenerating data and repairing data blocks and parity blocks. If the regenerated data can not be written on the failed disk, the RAID array must operate with a missing disk which both decreases performance of the array and the reliability of data. Of course, a replacement disk can be substituted for the failed disk and the regenerated data is then written on the replacement disk to bring the RAID array back to full redundant operation. The operation of the RAID array with a failed disk that can not be reconstructed and before a replacement disk is substituted is the subject of the present invention.

A RAID-4 or RAID-5 array is organized as a collection of strips, each of which contains a chunk from each disk in the array. One of the chunks in a strip contains the parity for the other chunks in the strip. In a RAID-5 organization parity chunks are located on different disks of the array in successive strips. In a RAID-4 organization all parity chunks are located on the same disk in the array.

Figure 2:
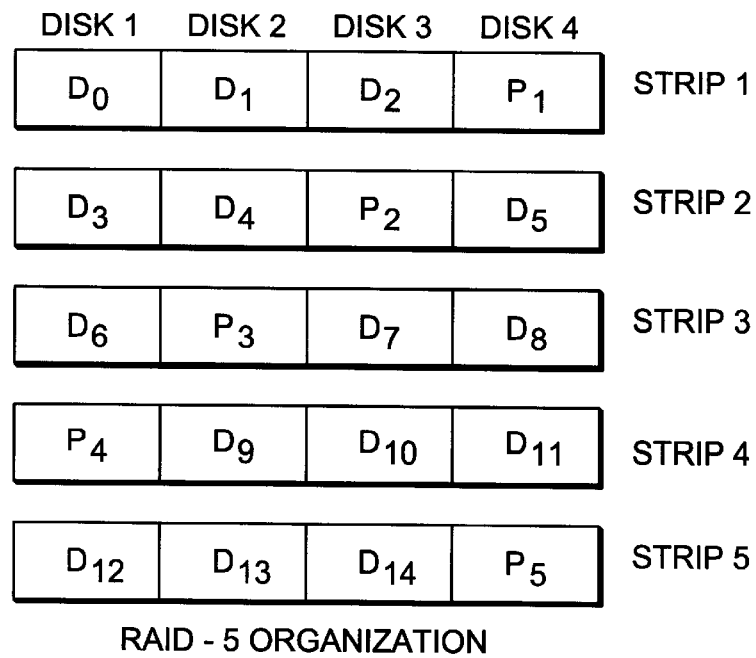
FIG. 2 is an illustration of the strips comprising a four disk storage system organized according to RAID-5.

FIG. 2 illustrates five strips of a four disk RAID array organized according to RAID-5. A plurality of data blocks forming data chunk $D_0$ are located on Disk 1, another plurality of data blocks forming data chunk $D_1$ are located on Disk 2, another plurality of data blocks forming data chunk $D_2$ are located on Disk 3 and another plurality of blocks forming parity chunk $P_1$ are located on Disk 4. The remaining strips are organized in a similar fashion with the parity chunk for the data chunks of each strip being located on a different disk than the preceding or following strip.

Parity chunk $P_1$ is a set of blocks that are the Exclusive-OR parity of the sets of data blocks or chunks $D_0$, $D_1$ and $D_2$. The other parity chunks are similarly identified. Each chunk of data is a consecutively indexed set of blocks on the underlying disk. There are various patterns of data and parity in successive strips that are well known and these differences are irrelevant to the present invention. The data on the virtual disk that is presented by the array is stored on the data blocks in the order $D_0$, $D_1$, $D_2$, $D_3$, $D_4$, etc. Accordingly, ascending data addresses first cover a chunk, then a strip and finally move to the next strip.

Figure 3:
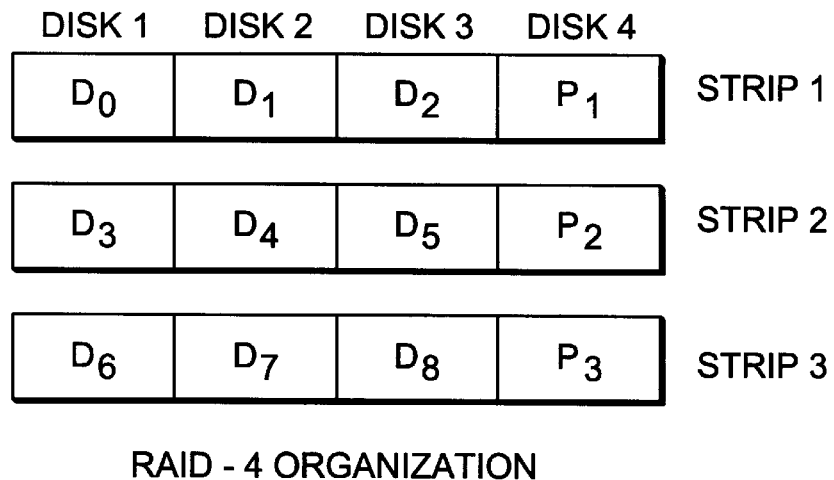
FIG. 3 is an illustration of the strips comprising a four disk storage system organized according to RAID-4.

FIG. 3 is an illustration of three strips of a four disk RAID array organized according to RAID-4. As is well known, the parity chunks $P_1$, $P_2$, and $P_3$ for each strip are located on the same disk in the array. Accordingly RAID-5 is essentially a generalization of RAID-4 where the location of data and parity chunks within a strip is defined according to some algorithm that is controlled by the index of the strip within the array.

The cost of operations on a RAID-4 or RAID-5 array with a failed disk is different than the cost of operations on the array when a full, redundant set of disks is available. For a RAID-4 or RAID-5 array of n+1 disks, assuming that there are no local errors on any of the non-failed disks, the range of costs of an I/O request targeting data that is nominally contained within a contiguous range of blocks within a single chunk and where n is greater than 1 is, for the two cases of no failed disks and a single failed disk set forth in Table No. 1.

TABLE NO. 1

| Operation | Full Set of Disks | One Disk Failed |
| --- | --- | --- |
| Best case READ | 1 I/O | 1 I/O |
| Worst case READ | 1 I/O | n I/O's |
| Best case WRITE | Min (4, n + 1) I/O's | 1 I/O |
| Worst case WRITE | Min (4, n + 1) I/O's | Max (4, n) I/O's |

For read operations with a full set of disks, a read operation only reads from the disk containing the data. In this situation neither parity nor other data needs to be read. For the worst case READ with the target data block located on the failed disk n read operations are required since the parity block and the remaining n−1 data blocks must be read for regeneration. For the case of WRITE operations with a full set of disks, 4 I/O's are required when the read-modify-write method is used and (n+1) I/O's are required when the reconstruct-write method is used. The read-modify-write method is a write operation comprising the following:

1. Read the data currently in the blocks to be written, referred to as "old" data;
2. Read the parity blocks corresponding to the "old" data, referred to as "old" parity;
3. Exclusive-OR the "old" data with the "old" parity and Exclusive-OR the new data into that parity, referred to as "new" parity;
4. Write the new data to the target data blocks; and
5. Write the "new" parity to the corresponding parity blocks.

The reconstruct-write method is a write operation comprising the following:

1. Identify the set of blocks to which new data is to be written;
2. Read the data from the blocks which are not targets of the write and which contributed to the same parity blocks as the new data;
3. Write the new data to the target data blocks;
4. Write the new parity to the corresponding parity blocks.

Both the read-modify-write method and the reconstruct-write method are well known to those of ordinary skill in the field. Of course, an implementation will typically take these differences in I/O's into account in choosing a method to perform the operation.

In the worst case READ, since all remaining n disks must be read and the unavailable data regenerated, as can be seen in Table 1, the cost of read operations increases overall when a disk is missing. However, the cost of write operations overall changes in a less straight-forward manner. In the best case, the disk is available where the data is to be written and the parity was on the missing disk. In that case the data is just written with no parity update. In the worst case, if the missing disk contains the data location to be written, then using the reconstruct-write method, all remaining n−1 blocks must be read and together with the new data Exclusive-ORed to obtain the new parity which is then written over the old parity to disk, for a total of n operations. In the worst case, if the missing disk does not contain the data location to be written or the parity, then using the read-modify-write method, both the data block and the parity block must be read and written for a total of four (4) operations.

When an array is without a disk, the impact of the failure of a single block on the surviving disks becomes important. In an array with a failed disk, the failure of a single block on a surviving disk causes the loss of either a single block of data, namely the block that is stored on the missing or failed disk, if this failed single block contains parity information, or 2 blocks of data namely, the block that is stored on the missing disk with which the failed block shares parity and the failed block itself, if the failed single block contains data. Thus, a block of data stored on a RAID-4 or RAID-5 array with one missing disk is less reliable than one block of data stored on a single, non-array disk or on a RAID-0 array since, in either of these cases, the failure of a single block causes the loss of exactly 1 block of data. RAID-0 is a level of organization in which data is stripped over all disks but no redundant or parity information is stored.

The present invention reorganizes the data in a RAID4 or RAID-5 array at the time that a disk becomes unavailable. The reorganization assures that read and write operations to the array require only the optimal number of operations and that the performance of the array and the reliability of data stored on the array is maximized.

Figure 4:
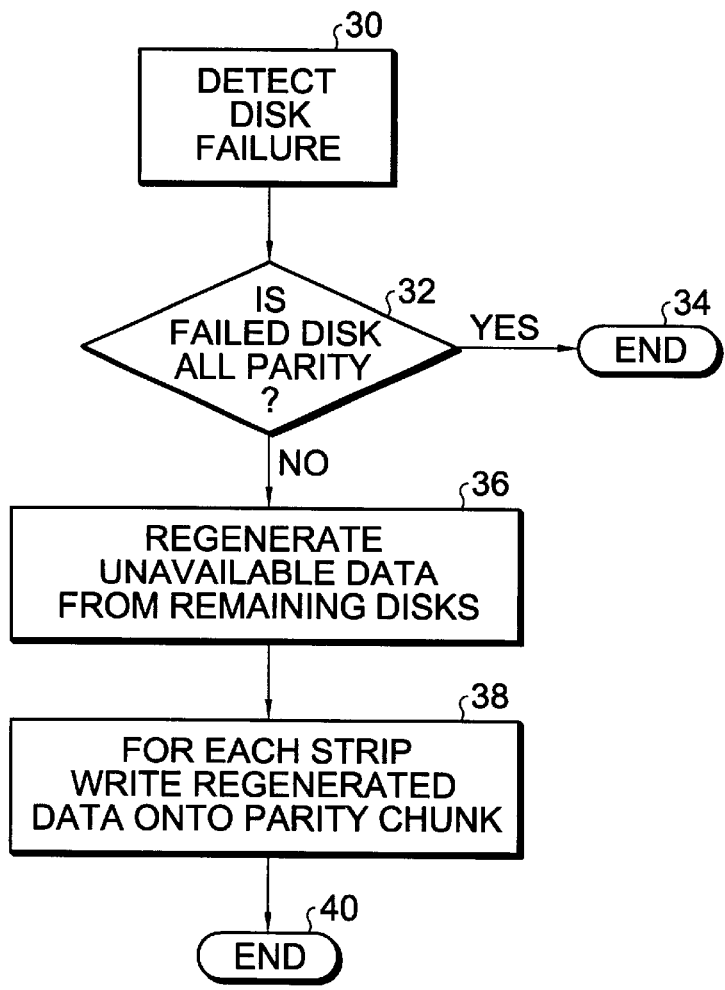
FIG. 4 is a flow chart for the process of folding a RAID array according to the present invention.

FIG. 4 is a flow chart illustrating the process of reorganization of the data when a disk in the RAID array fails. The failure of a disk in the array is detected at step 30. It is determined whether the failed disk was all parity at step 32 which would only be possible in a RAID-4 organization. If the failed disk only contained parity, all of the data remains and no reorganization of the data is necessary and the process ends at step 34. If the failed disk was not all parity, either RAID-4 or RAID-5 organization, then the reorganization of data according to the present invention begins with the regeneration of the missing data from the remaining disks at step 36 using the standard RAID algorithms. The regeneration continues one strip at a time. The regenerated data for each strip is then stored at the chunk for that strip which originally containing parity at step 38. After all strips are reorganized, the process stops at step 40.

Figure 5:
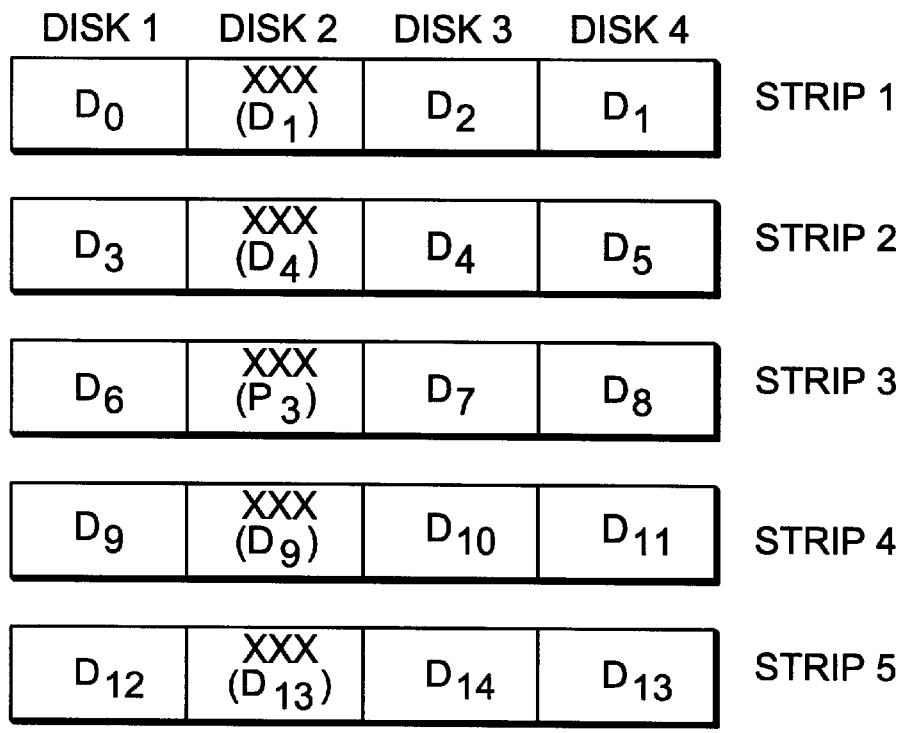
FIG. 5 is an illustration of the strips comprising a four disk storage system organized according to RAID-5 fully folded according to the present invention.

FIG. 5 is an illustration of a four disk storage system using RAID-5 organization as shown in FIG. 2 that has been reorganized due to the failure of Disk 2. For strip 1, the regeneration process uses the data from chunks $D_0$ and $D_2$ and the parity from chunk $P_1$ to obtain the data unavailable from chunk $D_1$ on Disk 2. The data for chunk $D_1$ is then written on Disk 4 over the original parity information. For strip 2, the regeneration process uses the data from chunks $D_3$ and $D_5$ and the parity from chunk $P_2$ to obtain the data unavailable from chunk $D_4$ on Disk 2. The data for chunk $D_4$ is then written on Disk 3 where the original parity chunk $P_2$ was located. For strip 3, no regeneration is necessary since the chunk lost contained only parity. Accordingly, no reorganization of the data is necessary. For strip 4, the regeneration process uses data from chunks $D_{10}$ and $D_{11}$ and the parity from chunk $P_4$ to obtain data unavailable from chunk $D_9$ on Disk 2. The data for chunk $D_9$ is then written on Disk 1 where the original parity chunk $P_4$ was located. For strip 5, the regeneration used the data from chunks $D_{12}$ and $D_{14}$ and the parity chunk $P_5$ to obtain the data unavailable from chunk $D_{13}$ on Disk 2. The data for chunk $D_{13}$ is then written on Disk 4 where the original parity chunk $P_5$ was located.

The reorganized strips are illustrated in FIG. 5. After the reorganization, the resulting organization is essentially a RAID-0 array. The resulting array is referred to as a fully folded RAID-5 array and the process of reorganization is referred to as folding.

Figure 6:
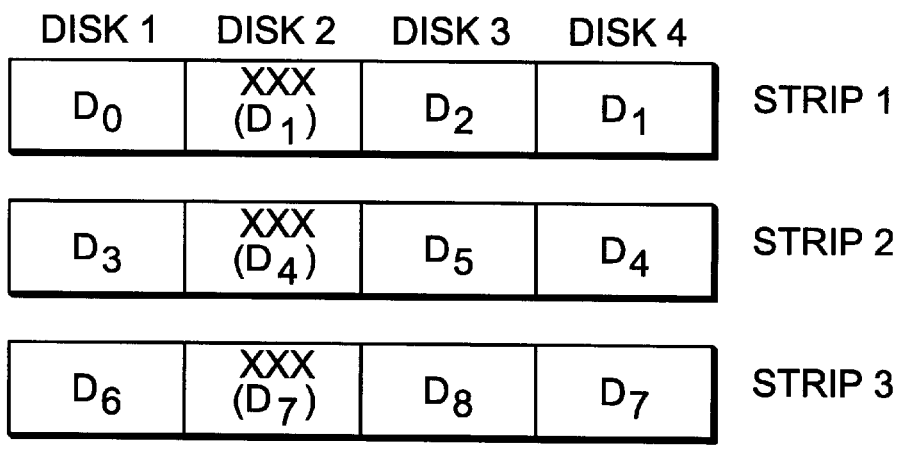
FIG. 6 is an illustration of the strips of a storage system organized according to RAID-4 fully folded according to the present invention.

FIG. 6 illustrates a fully folded RAID-4 array after array Disk 2 failed. The same reorganization process as described above is used to regenerate the data for the failed disk and to write the regenerated data onto the strip chunk previously containing parity.

Figure 7:
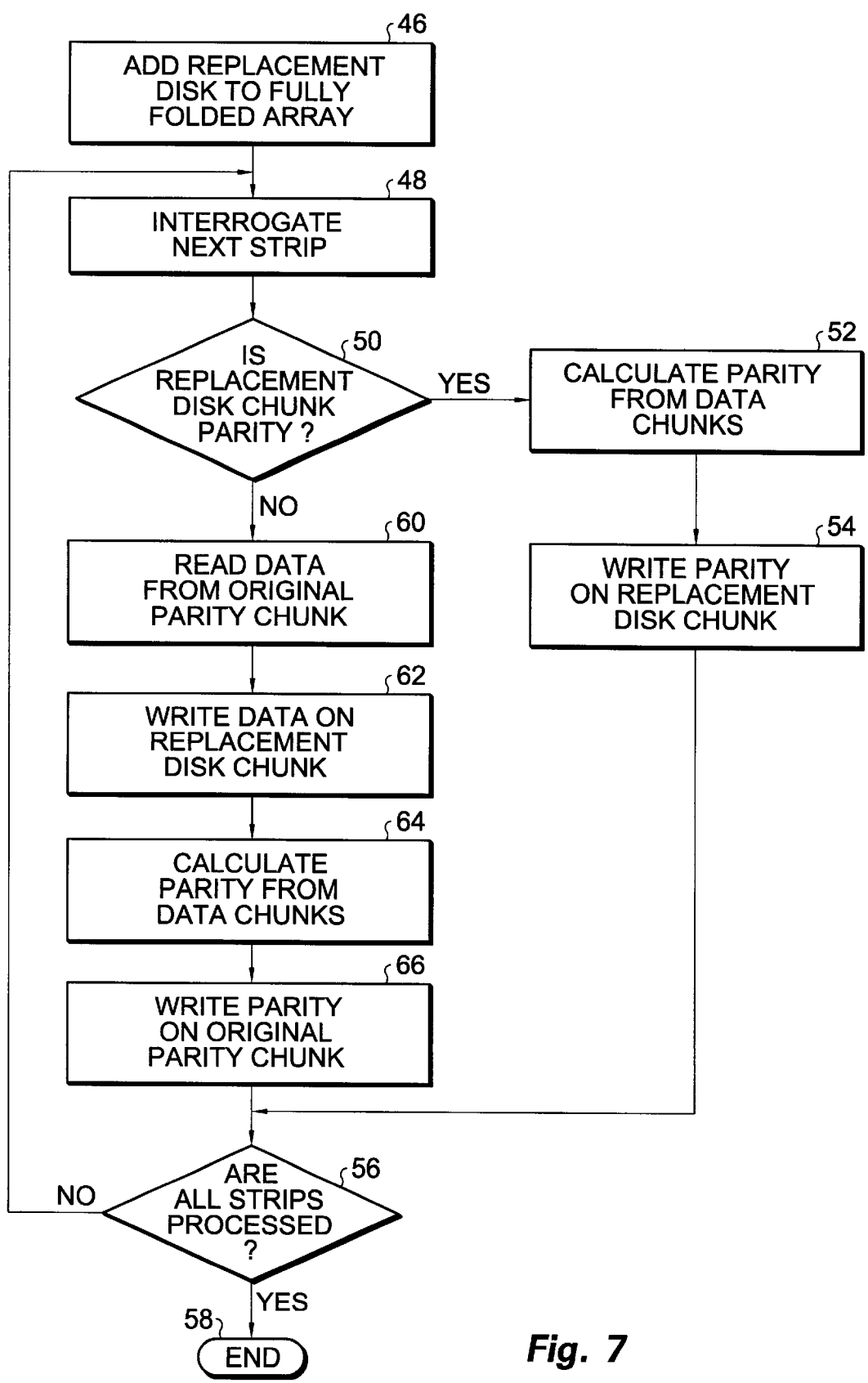
FIG. 7 is a flow chart for the process of unfolding a RAID array according to the present invention.

The process for unfolding a fully folded RAID array is set out in FIG. 7. After a replacement disk is added to a fully folded RAID array at step 46 in order to restore the array to a redundant state, the reorganization of data must be reversed. The unfolding proceeds one strip at a time by interrogating the next strip at step 48 and determining the nature of the first replacement chunk at step 50. If the replacement chunk is parity then the parity information is regenerated from the remaining data chunks at step 52. The regenerated parity is written on the replacement parity chunk at step 54 and the process now determines if all strips have been processed at step 56. If all strips have been processed, then the process ends at is step 58. If there are remaining unprocessed strips, then the process loops back to step 48. If the replacement chunk is a data chunk, then the data currently stored on the chunk originally containing parity is read at step 60. The read data is written on the replacement disk chunk at step 62. Next, the parity for the strip is calculated from the data chunks at step 64. The new parity is written on the original parity chunk at step 66. The process now determines if all strips have been processed at step 56. If all strips have been processed the process ends at step 58. If there are remaining unprocessed strips then the process loops back to step 48. The entire reorganization process described above is repeated for each strip in the array until all of the original data and parity chunks for the failed disk have been regenerated and written to the replacement disk.

A process for reorganizing the data on a RAID array with a failed disk to maximize performance of the array and reliability of the data and minimize cost of operation has been described. In a RAID array with a failed disk the folding operation reorganizes the data by regenerating the unavailable data using the standard RAID algorithms and writing the regenerated data over the parity information. Thus, each strip in the RAID array contains only data and all parity information is removed. The RAID-4 or RAID-5 organization is essentially converted to a RAID-0 organization. After the failed disk is replaced the fully folded RAID array is returned to its original RAID-level by the process of unfolding. The unfolding process realigns the data to its original position in the strip and calculates the removed parity information and writes the parity information in its original chunk of the strip.

What is claimed is:

1. In a storage system having n+1 disks arranged in a RAID array, a plurality of data blocks arranged into a plurality of data chunks, a plurality of parity blocks arranged into a plurality of parity chunks, each parity block associated with n data blocks in n data chunks, said data chunks and said parity chunks distributed over said n+1 disks, one of said parity chunks and all of said data chunks that are associated with said parity chunk forming a strip, a method of reorganizing said data chunks when one of said n+1 disks fails, comprising the steps of:

detecting the failure of one of said n+1 disks;

determining if said failed disk contains all parity chunks;

if said failed disk contains all parity chunks, terminating said method;

if said failed disk contains at least some data chunks, then for each strip containing a data chunk located on said failed disk, regenerating the data of said data chunk located on said failed disk and writing said regenerated data onto said parity chunk associated with said data chunk of said failed disk to form a fully folded array.

2. In a storage system having n+1 disks arranged in a RAID array, a plurality of data blocks arranged into a plurality of data chunks, a plurality of parity blocks arranged into a plurality of parity chunks, each parity block in a parity chunk associated with n data blocks in n data chunks, said data chunks and said parity chunks distributed over said n+1 disk, one of said parity chunks and all of said data chunks that are associated with said parity chunk forming a strip, a method of reorganizing said data chunks when one of said n+1 disks fails, comprising the steps of:

detecting the failure of one of said n+1 disks;

determining if said failed disk contains all parity chunks;

if said failed disk contains all parity chunks, terminating said method;

if said failed disk contains at least some data chunks, reorganizing said data chunks of said array to form an array with the characteristics of a RAID level 0 array.

3. In a storage system having n active disks and one failed disk formerly organized into strips when said failed disk was active, a plurality of data blocks arranged into a plurality of data chunks, said data chunks distributed over said n active disks and said n active disks arranged into a fully folded array, the failed disk having chunks, each of said chunks located on a different one of said strips, a method of restoring said fully folded array to a fully redundant condition comprising the steps of:

substituting a replacement disk for said failed disk;

determining, for each one of said strips if said chunk of said failed disk originally contained only parity information or originally contained data;

if said failed disk chunk originally contained only parity information, then calculate said parity information from said data chunks originally associated with said parity information and write said parity information on a corresponding chunk of said replacement disk;

if said failed disk chunk originally contained data, then determine which one of said n active disks originally contained a chunk of parity information;

read said data from said one of said n active disks;

write said data on said corresponding replacement disk chunk;

calculate new parity information for said strip; and write said recalculated parity information to said one of said n active disk.

* * * * *